Dec. 29, 1942.  L. D. MOWREY  2,306,828
WELL FLOWING DEVICE
Filed Oct. 23, 1940  2 Sheets-Sheet 1
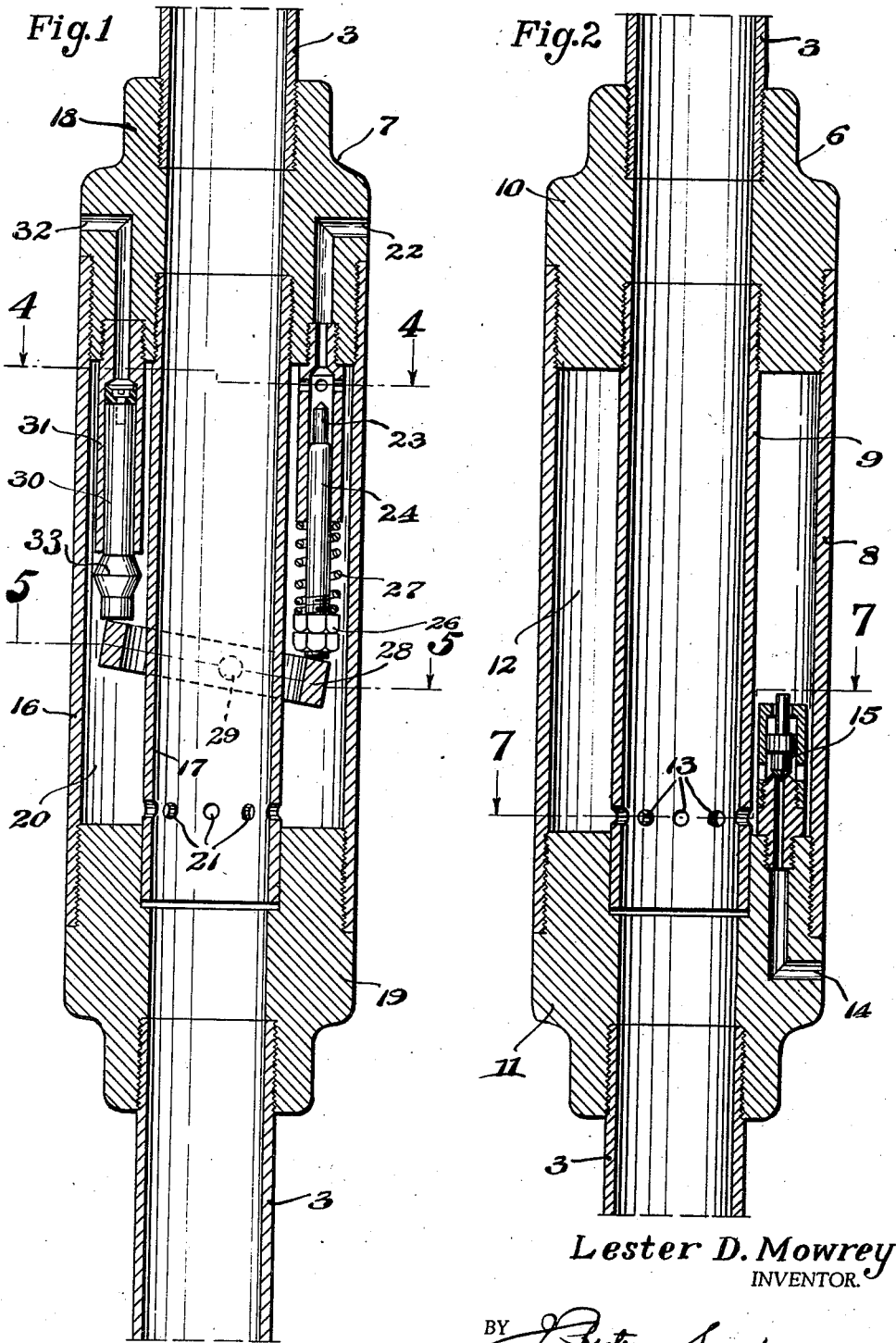
Lester D. Mowrey
INVENTOR.
BY J. Preston Swecker
his ATTORNEY.

Dec. 29, 1942.    L. D. MOWREY    2,306,828
WELL FLOWING DEVICE
Filed Oct. 23, 1940    2 Sheets-Sheet 2
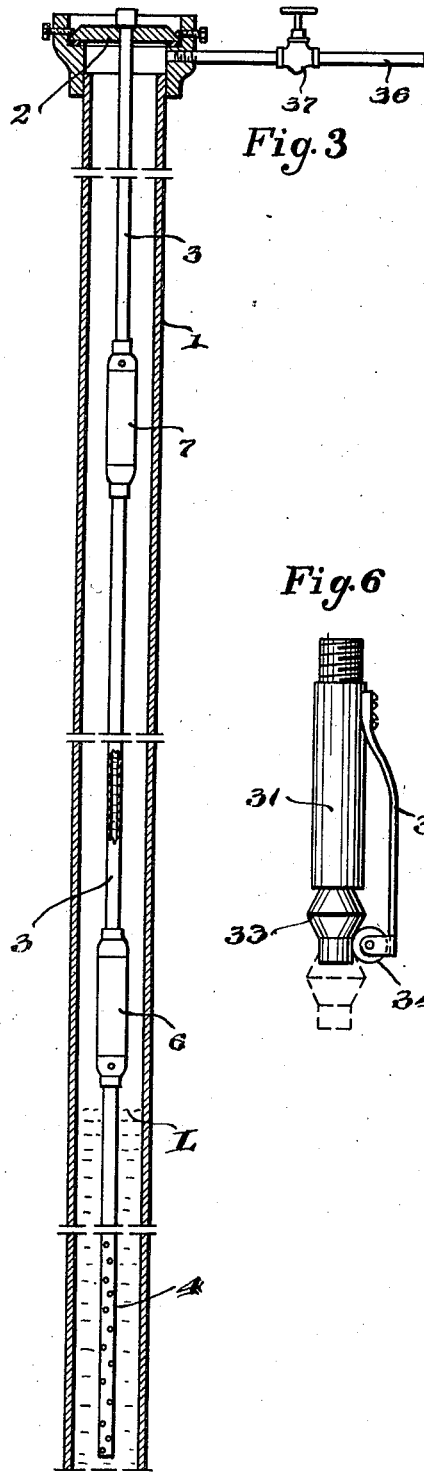
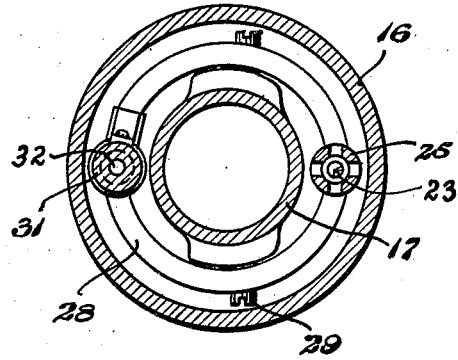
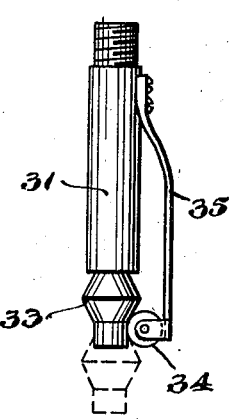
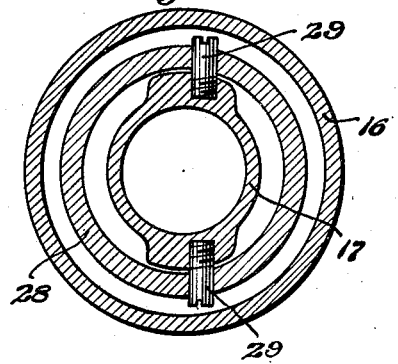
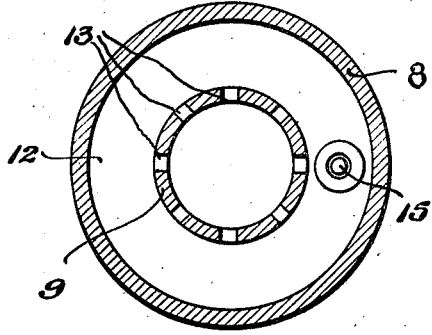
Lester D. Mowrey
INVENTOR.
BY
ATTORNEY.

Patented Dec. 29, 1942

2,306,828

UNITED STATES PATENT OFFICE 2,306,828

WELL FLOWING DEVICE

Lester D. Mowrey, Wichita Falls, Tex.

Application October 23, 1940, Serial No. 362,446

16 Claims. (Cl. 103—233)

This invention relates to an improvement in well flowing devices, and more particularly to the type generally referred to as "gas lift" by which gas or air is introduced into a fluid column for aerating the liquid so as to cause it to flow from the well.

Heretofore, various attempts have been made to aerate oil in a column by means of air or gas pressure introduced thereto, but these devices have often been unsatisfactory because of the great quantity of air or gas required in proportion to the amount of liquid to be removed from the well.

The object of this invention is to improve the construction of such devices by maintaining a differential of pressure between the outside and inside of the tubing; by maintaining an aerated condition at all times during the operation of the unit, so as to give the maximum flowing efficiency with the introduction of a minimum of gas or air.

This object is accomplished in the present invention by the provision of a valve mechanism which will act in response to a differential of pressure between the outside and inside of the tubing, so that when the pressure within the tubing reaches a predetermined quantity, an aerating medium, such as gas or air, is introduced into the tubing from an external point, so that the liquid within the tubing is aerated thereby and caused to flow upward due to its aerated condition.

In flowing oil from wells by means of gas pressure, the maximum efficiency whereby the greatest quality of oil is lifted with the smallest quantity of gas, is attained by regulating the flow of gas, so that it will cut off when it is not aerating the maximum column of liquid.

This is accomplished by controlling the gas admission valve in response to a differential of pressure between the column of liquid and the gas under pressure to be admitted thereto, whereby the gas acts on a plunger normally tending to close the admission valve, counteracting the pressure of the liquid which acts in the opposite direction on said plunger, and the valve is opened or closed according to which of the pressures is excessive, provision preferably being made for maintaining a set condition for a substantial period of time without fluctuations of the valve as a result of slight variations in pressure.

It is also preferable in this invention to have a small gas feeder valve slightly above the normal level of the liquid in the casing. This valve has a relatively small opening which admits sufficient gas into the liquid, so as to decrease the specific gravity and also to cause the liquid level to rise higher in the tubing. By the provision of this gas feeder valve, the normal gas admission valve may be placed several hundred feet above the point where a gas flow valve would normally be required thereby obtaining greater efficiency with the unit.

A preferred embodiment of the invention is illustrated in the accompanying drawings, in which:

Fig. 1 is a longitudinal sectional view through the differential flow valve mechanism;

Fig. 2 is a similar view through the feeder valve mechanism;

Fig. 3 is a vertical sectional view through a well casing, showing the flowing device installed therein;

Fig. 4 is a cross section through the differential flow valve mechanism, on the line 4—4 of Fig. 1;

Fig. 5 is a similar view on the line 5—5 thereof;

Fig. 6 is a side elevation of the plunger mechanism and regulator; and

Fig. 7 is a cross section through the feeder valve, on the line 7—7 of Fig. 2.

Referring to Fig. 3 of the drawings, the numeral 1 designates a well casing, such as is usually provided in deep wells and has a cap or cover 2 at the upper end thereof, so as to hold the required pressure in the casing 1. The casing 1 extends down in the well preferably into the body of oil or liquid contained therein, designated generally at L in Fig. 3.

Within the casing 1 is a string of tubing designated generally by the numeral 3, passing through the cap or cover 2 with a fluid tight fit therewith. The tubing 3 extends to a point below the liquid level within the well and usually has a perforated joint 4 at the lower end thereof which is adapted to be completely submerged in the liquid L and through which the liquid rises in a column inside the tubing.

In the operation of the usual gas lifts, it is recognized that better results can be obtained by the provision of gas admission valves or units at intervals throughout the height of the tubing for admitting air or gas to the column of liquid inside the tubing so as to aerate said liquid column and cause it to rise up through the tubing flowing out through the upper end portion thereof.

In this invention, I preferably employ two flowing units in the tubing 3, one of which is shown generally at 6 in Fig. 3, and is referred to as a feeder unit while the other is shown generally at 7 spaced an appreciable distance above the feeder unit in the tubing, and is referred to as the differential flow valve mechanism. The feeder unit 6 is provided in the tubing immediately above the liquid level L, and as the gas pressure within the annular space between the casing 1 and tubing 3 builds up, the liquid is forced into the tubing 3 where it rises to a point above the feeder unit 6.

The construction of the feeder unit 6 is shown generally in Fig. 2, as having an outer casing 8 and an inner tube 9 telescopically connected together and held in spaced relation by upper and lower heads 10 and 11, respectively. The inner tube 9 is preferably constructed with an inside diameter substantially the same as the inner diameter of the tubing 3 to facilitate smooth flow therethrough. The inner tube 9 is shown as provided with a screw-threaded connection with the upper head 10, while having a sliding fit with the lower head 11 to facilitate assembly of the structure.

The spaced relation of the casing 8 and inner tube 9 provides for a chamber 12 therebetween, which chamber 12 has communication through orifices 13 with the interior of the inner tube 9.

The lower head 11 has a passageway 14 extending therethrough and communicating at one end thereof with the periphery of the head 11, while the opposite end thereof is adapted to admit air or gas into the chamber 12 under the control of a check-valve 15 provided at the inner end of the passageway 14 within said chamber.

In this way, the air or gas under pressure around the tubing 3 within the casing 1 will be admitted through the passageway 14 by the check-valve 15 into the chamber 12, substantially to fill the chamber and to supply gas through the orifices 13 into the column of liquid within the inner tube 9, and passing upwardly in the tubing. This maintains a constant head of gas pressure in the chamber 12 which is thereby applied to the liquid column for intermixing therein and aerating the liquid to an extent which will cause it to rise or flow upward in the tubing 3 to a greater extent than would be the case normally without such air or gas admission thereto.

The differential flow valve mechanism designated generally by the numeral 7 is preferably placed several hundred feet below the maximum fluid level in the tubing 3, so that at a predetermined pressure gas or air may be admitted thereto for aerating the liquid to cause the liquid to flow out through the tubing.

This differential valve mechanism is shown in Fig. 1, having a casing 16 with an inner tube 17, connected together by upper and lower heads 18 and 19, respectively. The inner tube 17 has an inside diameter substantially coextensive with the inner diameter of the tubing 3 to facilitate uninterrupted flow therethrough, and has a screw-threaded connection with the upper head 18 and a sliding fit with the lower head 19 to facilitate assembly of the structure.

The casing 16 and inner tube 17 are spaced apart and held in concentric relation by the heads 18 and 19, providing an annular chamber 20 therebetween surrounding the inner tube and having communication with the interior thereof through a plurality of orifices 21 at the lower end of said chamber.

The upper head 18 has a passageway 22 therethrough from the periphery of the head into the upper end of the chamber 20. The inner end of said passageway 22 is adapted to be controlled by a check valve 23 carried by a valve stem 24 slidably mounted in a valve casing 25 to seat in the upper end of said casing, as shown in Fig. 1. The valve stem 24 has a head 26 on the lower end thereof between which and the end of the casing 25 is a coiled spring 27 sleeved over the valve stem, normally tending to urge the valve 23 downwardly away from its seat to admit gas pressure through the passageway 22 into the chamber 20. The head 26 is preferably provided as a nut screw-threaded on the lower end of the valve stem capable of adjustment relative thereto to vary the tension on the spring 27 to allow the valve 23 to open or close at the desired pressure, thereby regulating the height of the liquid head maintained in the tubing 3.

The lower end of the valve stem 24 rests freely on one side of a rocking member 28, preferably in the form of a ring surrounding the inner tube 17 (Fig. 5) and pivoted thereto on pins 29. The pivots 29 are off-set at one side of the longitudinal axis of the inner tube 17, so as to provide respectively long and short arms on the rocking member 28, the short arm supporting the valve stem 24 and acting thereon.

The long arm of the rocking member 28 supports the lower end of a plunger 30 slidably mounted in a cylinder 31 suspended from the lower face of the head 18 and communicating at its upper end with a passageway 32 leading through the head to the periphery thereof through which the upper end of the plunger is acted on by the gas or air under pressure within the casing.

To prevent only slight opening movement of the valve or movement thereof in response to fluctuations of pressure, provision is made for holding the plunger 30 in either extreme position until a substantial variation of pressure has been built up. This involves the provision of an engagement 33 on the lower end portion of the plunger 30 having oppositely tapering upper and lower faces acted on respectively by a roller 34 carried by a leaf spring 35 attached to a side of the sleeve 31. As pressure is applied to the upper end of the plunger 30 tending to move it downward in the cylinder, such downward movement is resisted by the spring-pressed roller 34 until sufficient pressure is built up to overcome this spring pressure permitting the roller to pass over the enlargement 33, when said roller will then engage the opposite face of the enlargement and tend to hold the plunger in its set position until the pressure in the opposite direction builds up sufficiently to cause movement of the plunger, as described.

Initially, the pressure in the casing 1 will act on the oil in the well to force a column of oil upward in the tubing above the feeder valve 6, with the height of the column of oil in the casing below the feeder valve. Gas under pressure will then flow through the passageway 14, past the valve 15, and through the orifices 13 into the column of oil in the tubing to aerate said column and cause an upward surge thereof to a point above the valve 7.

Before the column of oil has been forced up in the tubing above the valve 7, the pressure in the casing 1 will act on the plunger 30 to hold the valve 23 closed. When the column of oil rises in the tubing to a point sufficiently above the valve 7 to build up a differential pressure in the chamber 20 which, together with the spring 27 and the relative sizes of the surfaces, will overbalance the casing pressure, forcing the plunger 30 upward, as shown in Fig. 1, opening the valve 23, and admitting gas from the casing into the chamber 20, thence through the row of orifices 21 into the column of oil, aerating said oil and causing another upward surge thereof.

As the oil is thus aerated by the gas, its specific gravity is lowered, reducing the pressure in the chamber 20, and allowing the valve 23 to close under the casing pressure acting on the upper end of the plunger 30. Then as additional oil is forced up in the column by the feeder valve 6, the pressure again builds up in said chamber, repeating the operation as described.

Thus the gas is conserved, and fed to the column of oil only as required, without wasting. Therefore, only the minimum amount of gas is used to flow the oil through the tubing.

The feeder valve 6 acts as an equalizer to raise the height of the column of oil in the tubing directly according to the pressure in the casing.

In this way, the air or gas supply is conserved and utilized only for lifting the greatest quantity of oil with a predetermined quantity of air or gas, thereby obtaining maximum operating efficiency for the system.

The presence of the chamber 20 will provide a constant supply of air or gas for the column of liquid, under normal operating conditions, whereby substantial and continuous supply of air or gas will be maintained through the orifices 21 and to create substantial and constant flow upward through the tubing.

As many different flow units 7 may be provided in the tubing as desired, but should be located above the liquid level in the casing 1 and below the liquid level in the tubing 3.

A pipe 36 is connected with the upper end of the casing, controlled by a valve 37, for the introduction of air or gas under pressure when the pressure of the producing formation is insufficient to operate the system.

I claim:

1. In a well flowing device, the combination of a tubular structure adapted for flow of a column of liquid therethrough and adapted to be surrounded by gas under pressure, means for admitting gas under pressure to said tubular structure, a lever operatively connected with said gas admitting means, and means responsive to a differential of pressure outside and inside the tubular structure and operatively connected with the lever for controlling the gas admitting means.

2. In a well flowing device, the combination of a tubular structure adapted for flow of a column of liquid therethrough and adapted to be surrounded by a gas under pressure, means for admitting gas under pressure to said tubular structure for aerating the column of liquid, a lever operatively connected with said gas admitting means, and fluid pressure responsive means constructed and arranged for responsive action to a differential of pressure outside and inside of the tubular structure and operatively connected with the lever for controlling said gas admitting means.

3. In a well flowing device, the combination of a tubular structure adapted for flow of a column of liquid therethrough and adapted to be associated with an external supply of gas under pressure, valve means for admitting gas under pressure to the tubular structure for aerating the column of liquid flowing therethrough, a lever operatively connected with said gas admitting means, and means responsive to a differential of pressure outside and inside of the tubular structure and operatively connected with the lever for controlling said valve means.

4. In a well flowing device, the combination of a tubular structure adapted for flow of a column of liquid therethrough and adapted to be associated with an external supply of gas under pressure, valve means for admitting gas under pressure to the tubular structure for aerating the column of liquid flowing therethrough, a lever operatively connected with the valve means, and fluid pressure responsive means operatively connected with the lever for moving the same to control the valve means, said fluid pressure responsive means having different sides thereof arranged to be acted on respectively by fluid pressure externally and internally of the tubular structure for movement of the valve means in response to a differential of pressure therebetween.

5. In a well flowing device, the combination of a well casing, a tubing within the casing, means for sealing the upper end of the casing around the tubing, means for admitting gas under pressure from within the casing into the tubing, a valve for controlling said gas admitting means, and a piston operatively connected with the valve separate therefrom and movable relative thereto, said piston having one end thereof arranged exposed to pressure within the tubing and the opposite end thereof arranged continuously exposed to the pressure externally of the tubing for actuation in response to a differential of pressure outside and inside of the tubing.

6. In a well flowing device, the combination of a well casing, a tubing within the casing, means for sealing the upper end of the casing around the tubing, means for admitting gas under pressure from within the casing into the tubing, a valve for controlling said gas admitting means, a piston arranged for movement in response to a differential of pressure outside and inside of the tubing, and a lever operatively connecting said piston with the valve for controlling the action thereof.

7. In a well flowing device, the combination of a well casing, a tubing within the casing, means for sealing the upper end of the casing around the tubing, means for admitting gas under pressure from within the casing into the tubing, a valve for controlling said gas admitting means, a piston arranged for movement in response to a differential of pressure outside and inside of the tubing, a lever operatively connecting said piston with the valve for controlling the action thereof, a pivotal support for said lever arranged adjacent an end thereof extending toward the valve, and resilient means acting on the valve opposing the closing movement thereof.

8. A differential flow valve mechanism comprising a casing having a tube associated therewith for flow of liquid therethrough, said casing having a fluid chamber therein communicating with the tube, means for admitting gas under pressure to said chamber, a valve for controlling said fluid admitting means, and a piston operatively connected with the valve separate therefrom and movable relative thereto, said piston having one end thereof arranged exposed to pressure within the tubing and the opposite end thereof arranged continuously exposed to the pressure externally of the tubing for action in response to a differential of pressure inside and outside of the casing.

9. A differential flow valve mechanism comprising a casing having a tube associated therewith for flow of liquid therethrough, said casing having a fluid chamber therein communicating with the tube, means for admitting gas under pressure to said chamber, a valve for controlling said fluid admitting means, a piston arranged for actuation in response to a differential of pressure inside and outside of the chamber, a lever operatively connected with the piston and valve at respective opposite ends thereof, a pivotal support for said lever adjacent the end thereof extending to the valve with a longer arm of leverage from said pivot to the piston then the arm of leverage extending from said pivot to the valve, and resilient means arranged to move the valve to an open position.

10. A differential flow valve mechanism comprising a casing having a chamber therein, an inner tube within the casing and surrounded by the chamber with means of communication from the chamber to the interior of the tube, means for admitting gas under pressure from externally of the chamber into said chamber, a valve for controlling said means of communication, a piston, means mounting said piston for action on opposite sides thereof of pressures inside and outside of the chamber, a lever operatively connecting said piston with the valve for movement of the valve in response to the piston, and a pivotal support for the lever.

11. A differential flow valve mechanism comprising a casing, heads closing opposite ends of the casing, a tube extending through the casing and connected with the heads, said tube being spaced from the casing forming a chamber therebetween and having means of communication from said chamber into the interior of the tube, said heads having separate passageways extending from points externally of the casing to said chamber, a valve for controlling one of said passageways, a spring acting on said valve tending to move the same away from a seated position, means for adjusting the tension of said spring, a cylinder connected with one of the heads in communication with the other passageway, a piston operatively mounted in said cylinder and having opposite sides thereof open respectively through the passageway externally of the chamber and to the interior of the chamber, a lever having opposite ends acting respectively on the piston and the valve for transmitting movement of the piston to the valve, and a pivotal support for said lever spaced nearer the end thereof toward the valve than the distance from said pivot to the opposite end of the lever providing long and short arms thereof acting respectively on the piston and valve.

12. In a well flowing device, the combination of a tubular structure adapted for flow of a column of liquid therethrough and to be associated with gas under pressure externally thereof, means forming a gas equalizing chamber in communication with the tubular structure externally thereof adjacent the lower portion thereof for supplying gas under pressure continuously to the column of liquid, and means forming a differentially controlled gas pressure chamber spaced upwardly of the tubular structure from the equalizing chamber and constructed for supplying gas under pressure intermittently to the column of liquid therethrough from externally of the tubular structure in proportion to the pressure in said differential chamber created by the column of liquid thereabove relative to the external gas pressure.

13. In a well flowing device, the combination of a tubular structure adapted for flow of a column of liquid therethrough and to be associated with gas under pressure externally thereof, means forming a gas equalizing chamber in open communication with the tubular structure externally thereof adjacent the lower portion thereof for supplying gas under pressure to the column of liquid, means for admitting gas continuously to said chamber until the inside and outside pressure thereof is substantially equalized, and means for supplying gas intermittently to said tubular structure at a point spaced above the equalizing chamber.

14. In a well flowing device, the combination of a tubular structure adapted for flow of a column of liquid therethrough and adapted to be associated with an external supply of gas under pressure, valve means for admitting gas under pressure to the tubular structure for aerating the column of liquid therein, slidable piston means responsive to a differential of pressure outside and inside the tubular structure for closing said valve means, and snap-action means for retarding the sliding movement of the piston means.

15. In a well flowing device, the combination of a tubular structure adapted for flow of a column of liquid therethrough and adapted to be associated with an external supply of gas under pressure, valve means for admitting gas under pressure to the tubular structure for aerating the column of liquid therein, slidable piston means responsive to a differential of pressure outside and inside the tubular structure for closing said valve means, and spring actuated means acting on the piston means tending to oppose closing action of the valve means until released by an excessive pressure by said pressure responsive means.

16. A pressure flow valve comprising a tubing coupling having a fluid port therein, valve means for controlling said port to admit gas under pressure into the coupling, a lever operatively connected with the valve, and means responsive to a differential of pressure outside and inside the coupling, and operatively connected with the lever for controlling the valve means.

LESTER D. MOWREY.